(12) United States Patent
Zrostlik et al.

(10) Patent No.: US 9,645,264 B2
(45) Date of Patent: May 9, 2017

(54) PRESSURE-COMPENSATED SOURCES

(71) Applicant: PGS Geophysical AS, Lysaker (NO)

(72) Inventors: Julie Slaughter Zrostlik, Ames, IA (US); Todd Allan Reinders, Granger, IA (US)

(73) Assignee: PGS Geophysical AS, Oslo (NO)

( * ) Notice: Subject to any disclaimer, the term of this patent is extended or adjusted under 35 U.S.C. 154(b) by 338 days.

(21) Appl. No.: 14/062,147

(22) Filed: Oct. 24, 2013

(65) Prior Publication Data
US 2014/0334254 A1    Nov. 13, 2014

Related U.S. Application Data

(60) Provisional application No. 61/820,645, filed on May 7, 2013.

(51) Int. Cl.
| | | |
|---|---|---|
| *G01V 1/04* | (2006.01) | |
| *G01V 1/145* | (2006.01) | |
| *G10K 9/12* | (2006.01) | |
| *G01V 1/38* | (2006.01) | |

(52) U.S. Cl.
CPC ............... *G01V 1/04* (2013.01); *G01V 1/145* (2013.01); *G10K 9/121* (2013.01); *G01V 1/38* (2013.01)

(58) Field of Classification Search
CPC . G01V 1/04; G01V 1/145; G01V 1/38; G01V 2210/1293; G01V 2210/1214; G10K 9/121
USPC ........................................................ 367/174
See application file for complete search history.

(56) References Cited

U.S. PATENT DOCUMENTS

| | | | |
|---|---|---|---|
| 3,384,868 A | | 5/1968 | Brown |
| 3,935,484 A | * | 1/1976 | Leschek ............... B06B 1/0685 |
| | | | 310/327 |
| 3,978,940 A | | 9/1976 | Bouyoucos |
| 4,142,171 A | * | 2/1979 | Pickens ................... G10K 9/10 |
| | | | 367/13 |
| 4,175,311 A | | 11/1979 | Bunyan |

(Continued)

FOREIGN PATENT DOCUMENTS

| | | |
|---|---|---|
| CA | 1171950 A1 | 7/1984 |
| EA | 200900209 A2 | 8/2009 |

(Continued)

OTHER PUBLICATIONS

European Search Report mailed on Nov. 17, 2014, in the prosecution of patent application No. 14165500.1-1559, U.S. Pat. No. 2,801,843, 6 pages.

(Continued)

*Primary Examiner* — James Hulka
*Assistant Examiner* — John T Nolan (57) ABSTRACT

Embodiments related to sound sources for marine geophysical surveys. An embodiment provides a sound source, comprising: an outer shell containing a first gas at a first gas pressure; and a compliance chamber in indirect fluid communication with the first gas, the compliance chamber containing a second gas at a second gas pressure, wherein the second gas pressure is lower than the first gas pressure. An embodiment provides a sound source for marine geophysical surveys, comprising: an outer shell; a mass coupled to the outer shell; and an actuator coupled to the outer shell. Additional apparatus and methods are disclosed herein.

31 Claims, 8 Drawing Sheets

(56) References Cited

U.S. PATENT DOCUMENTS

| | | |
|---|---|---|
| 4,185,714 A | 1/1980 | Pascouet et al. |
| 4,211,301 A | 7/1980 | Mifsud |
| 4,231,112 A | 10/1980 | Massa |
| 4,466,089 A | 8/1984 | Wachi |
| 4,483,411 A | 11/1984 | Mifsud |
| 4,556,963 A | 12/1985 | Hugus et al. |
| 4,557,348 A | 12/1985 | Mifsud |
| 4,578,784 A | 3/1986 | Mifsud |
| 4,739,859 A | 4/1988 | Delano |
| 4,785,430 A | 11/1988 | Cole |
| 4,853,905 A | 8/1989 | Myers |
| 4,868,799 A | 9/1989 | Massa |
| 4,885,726 A | 12/1989 | Myers |
| 5,016,228 A | 5/1991 | Arnold et al. |
| 5,050,129 A | 9/1991 | schultz |
| 5,126,979 A | 6/1992 | Rowe, Jr. et al. |
| 5,199,005 A * | 3/1993 | Forsberg ............ H04R 9/025 367/175 |
| 5,206,839 A | 4/1993 | Murray |
| 5,225,731 A | 7/1993 | Owen |
| 5,233,570 A | 8/1993 | Donskoy |
| 5,646,380 A | 7/1997 | Vaage |
| 5,757,726 A | 5/1998 | Tenghamn et al. |
| 5,757,728 A | 5/1998 | Tenghamn et al. |
| 5,959,939 A | 9/1999 | Tenghamn et al. |
| 5,978,316 A | 11/1999 | Ambs |
| 6,009,047 A | 12/1999 | Barger |
| 6,041,888 A | 3/2000 | Tenghamn |
| 6,076,629 A | 6/2000 | Tengham |
| 6,076,630 A | 6/2000 | Ambs |
| 6,085,862 A | 7/2000 | Tenghamn |
| 6,173,803 B1 | 1/2001 | Barger |
| 6,230,840 B1 | 5/2001 | Ambs |
| 6,556,510 B2 | 4/2003 | Ambs |
| 6,606,958 B1 | 8/2003 | Bouyoucos |
| 6,624,539 B1 | 9/2003 | Hansen et al. |
| 6,711,097 B1 | 3/2004 | Engdahl |
| 6,851,511 B2 | 2/2005 | Tenghamn |
| 6,901,028 B2 | 5/2005 | Clayton et al. |
| 7,142,481 B1 | 11/2006 | Metzbower et al. |
| 7,468,932 B2 | 12/2008 | Tenghamn |
| 7,539,079 B2 | 5/2009 | Hoogeveen et al. |
| 7,551,518 B1 | 6/2009 | Tenghamn |
| 7,562,740 B2 | 7/2009 | Ounadjela |
| 7,881,158 B2 | 2/2011 | Tenghamn |
| 7,926,614 B2 | 4/2011 | Tenghamn et al. |
| 7,929,380 B2 | 4/2011 | Wei et al. |
| 7,957,220 B2 | 6/2011 | Howlid et al. |
| 7,974,152 B2 | 7/2011 | Tenghamn |
| 8,050,139 B2 | 11/2011 | Berstad |
| 8,050,867 B2 | 11/2011 | Johnson et al. |
| 8,061,471 B2 | 11/2011 | Wei |
| 8,079,440 B2 | 12/2011 | Laycock |
| 8,081,540 B2 | 12/2011 | Ross |
| 8,094,514 B2 | 1/2012 | Tenghamn |
| 8,098,542 B2 | 1/2012 | Hillesund et al. |
| 8,102,731 B2 | 1/2012 | Cambois |
| 8,154,176 B2 | 4/2012 | Karakaya et al. |
| 8,167,082 B2 | 5/2012 | Eick et al. |
| 8,174,927 B2 | 5/2012 | Hopperstad et al. |
| 8,189,426 B2 | 5/2012 | West et al. |
| 8,205,711 B2 | 6/2012 | Hopperstad et al. |
| 8,261,875 B2 | 9/2012 | Eick et al. |
| 8,331,198 B2 | 12/2012 | Morozov et al. |
| 8,335,127 B2 | 12/2012 | Tenghamn |
| 8,342,288 B2 | 1/2013 | Eick et al. |
| 8,400,872 B2 | 3/2013 | Gulgne et al. |
| 8,427,901 B2 | 4/2013 | Lunde et al. |
| 8,441,892 B2 * | 5/2013 | Morozov ............ G01V 1/135 181/120 |
| 8,446,798 B2 | 5/2013 | Tenghamn |
| 8,630,149 B2 | 1/2014 | Thompson et al. |
| 8,634,276 B2 | 1/2014 | Morozov et al. |
| 8,670,292 B2 | 3/2014 | Engdahl |
| 8,804,462 B2 | 8/2014 | Barbour et al. |
| 8,971,152 B2 | 3/2015 | Chelminski |
| 2006/0193203 A1 | 8/2006 | Tenghamn et al. |
| 2008/0253226 A1 | 10/2008 | Tenghamn et al. |
| 2009/0147626 A1 | 6/2009 | Vahida et al. |
| 2009/0279387 A1 | 11/2009 | Tenghamn et al. |
| 2010/0118646 A1 | 5/2010 | Tenghamn |
| 2010/0118647 A1 | 5/2010 | Tenghamn |
| 2010/0322028 A1 | 12/2010 | Tenghamn |
| 2011/0038225 A1 | 2/2011 | Tenghamn |
| 2011/0069741 A1 | 3/2011 | Erickson |
| 2011/0075520 A1 | 3/2011 | Gulgne et al. |
| 2011/0085422 A1 | 4/2011 | Thompson et al. |
| 2011/0090759 A1 | 4/2011 | Laycock |
| 2011/0162906 A1 | 7/2011 | Harper |
| 2011/0297476 A1 | 12/2011 | Harper et al. |
| 2011/0317515 A1 * | 12/2011 | Tenghamn ............ G10K 9/121 367/20 |
| 2012/0048641 A1 | 3/2012 | Eick et al. |
| 2012/0075955 A1 | 3/2012 | Dean |
| 2012/0081997 A1 | 4/2012 | Babour et al. |
| 2012/0113747 A1 | 5/2012 | Ferber |
| 2012/0147699 A1 | 6/2012 | Dellinger et al. |
| 2012/0147709 A1 | 6/2012 | Zowarka, Jr. et al. |
| 2012/0155217 A1 | 6/2012 | Dellinger et al. |
| 2012/0188845 A1 | 7/2012 | Jeffryes |
| 2012/0232780 A1 | 9/2012 | Delson et al. |
| 2012/0243378 A1 * | 9/2012 | Morozov ............ G01V 1/135 367/143 |
| 2012/0314536 A1 | 12/2012 | Bagaini |
| 2013/0037342 A1 | 2/2013 | Engdahl |
| 2013/0100777 A1 | 4/2013 | Ruet |
| 2014/0238773 A1 | 8/2014 | Sallas |
| 2014/0334259 A1 | 11/2014 | Tenghamn |
| 2014/0340985 A1 | 11/2014 | Tenghamn et al. |
| 2015/0085605 A1 | 3/2015 | Tenghamn |
| 2015/0085606 A1 | 3/2015 | Tenghamn et al. |
| 2015/0085607 A1 | 3/2015 | Tenghamn |
| 2015/0085608 A1 | 3/2015 | Tenghamn et al. |
| 2015/0234072 A1 | 8/2015 | McConnell |

FOREIGN PATENT DOCUMENTS

| | | |
|---|---|---|
| EP | 0835462 B1 | 1/2003 |
| RU | 93052952 A | 2/1995 |
| RU | 2159945 C1 | 11/1999 |
| SU | 1274478 A | 10/1998 |
| WO | 9530912 A1 | 11/1995 |
| WO | 9701770 A1 | 1/1997 |
| WO | 1997001770 A1 | 1/1997 |
| WO | 0071266 A1 | 11/2000 |

OTHER PUBLICATIONS

English translation of Eurasian Notification of a publishing data of Patent Search Report and of filing a Request for Substantive Examination mailed on Oct. 7, 2014, in the prosecution of patent application No. 201490718/26, 2 pages.

Eurasian Notification of a publishing date of Patent Search Report and of filing a Request for Substantive Examination mailed on Oct. 7, 2014, in the prosecution of patent application No. 201490718/26, 2 pages.

Espacenet English Abstract of EA200900209, publication date Aug. 28, 2009, PGS Geophysical, 2 pages.

WIPO English Abstract of SU1274478 mailed Oct. 10, 1988, Far Eastern State Technical Fisheries University, 1 page.

Rune Tenghamn, "PGS Electical Marine Vibrator," Tech Link, Nov. 2005, pp. 1-3, vol. 5, No. 11, Publication of PGS Geophysical.

Rune Tenghamn and Andrew Long, PGS shows off electrical marine vibrator to capture 'alternative' seismic source market, First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Feng et al., "A Class IV Flextensional Device Based on Electrostrictive Poly(vinylidene fluoride-trifluoroethylene Copolymer," Jun. 2003, pp. 1-6.

(56) References Cited

OTHER PUBLICATIONS

Ralph S. Woollett, "Underwater Helmholtz-Resonator Transducers: General Design Principles," NUSC Technical Report 5633, Jul. 5, 1977, pp. 1-48.
Rolex Spring Catalog, MW Industries, Inc., 2009.
Fons Ten Kroode et al., "Broadband seismic data—The importance of low frequencies," Geophysics, Mar.-Apr. 2013, pp. WA3-WA14, vol. 78, No. 2.
Ralph S. Woollett, "Current Approaches to the Miniaturization and Pressure Release Problems of VLF Transducers," Naval Underwater Systems Center, Nov. 5, 1973.
Egyptian Examination report for Egyptian Application No. 651/2014 dated Aug. 11, 2016.

* cited by examiner

PRESSURE-COMPENSATED SOURCES

CROSS-REFERENCE TO RELATED APPLICATIONS

The present application claims the benefit of U.S. Provisional Application No. 61/820,645, filed May 7, 2013, entitled "Sound Source Passive Compliance Chamber," the entire disclosure of which is incorporated herein by reference.

BACKGROUND

Embodiments relate generally to sound sources for marine geophysical surveys. More particularly, embodiments relate to use of mechanisms such as added mass or compliance chambers in sound sources to compensate for volume changes of the gas internal to the sound source during operation.

Sound sources are generally devices that generate acoustic energy. One use of sound sources is in marine seismic surveying in which the sound sources may be employed to generate acoustic energy that travels downwardly through water and into subsurface rock. After interacting with the subsurface rock, e.g., at boundaries between different subsurface layers, some of the acoustic energy may be returned toward the water surface and detected by specialized sensors. The detected energy may be used to infer certain properties of the subsurface rock, such as structure, mineral composition and fluid content, thereby providing information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of sound source that can be used in seismic surveying includes vibrator sources, such as hydraulically powered sources, electromechanical vibrators, electrical marine seismic vibrators, and sources employing electrostrictive (e.g., piezoelectric) or magnetostrictive material. Vibrator sources typically generate vibrations through a range of frequencies in a pattern known as a "sweep" or "chirp."

Prior sound sources for use in marine seismic surveying have typically been designed for relatively high-frequency operation (e.g., above 10 Hz). However, it is well known that as sound waves travel through water and through subsurface geological structures, higher frequency sound waves may be attenuated more rapidly than lower frequency sound waves, and consequently, lower frequency sound waves can be transmitted over longer distances through water and geological structures than higher frequency sound waves. Thus, efforts have been undertaken to develop sound sources that can operate at low frequencies. Very low frequency sources ("VLFS") have been developed that typically have at least one resonance frequency of about 10 Hz or lower. VLFS's are typically characterized by having a source size that is very small as compared to a wavelength of sound for the VLFS. The source size for a VLFS is typically much less than $1/10^{th}$ of a wavelength and more typically on the order of $1/100^{th}$ of a wavelength. For example, a source with a maximum dimension of 3 meters operating at 5 Hz is $1/100^{th}$ of a wavelength in size.

In order to achieve a given level of output in the water, a marine sound source typically needs to undergo a change in volume. In order to work at depth while minimizing structural weight, the source may be pressure balanced with external hydrostatic pressure. As the internal gas (e.g., air) in the source increases in pressure, the bulk modulus (stiffness) of the internal gas also rises. This increase in bulk modulus of the internal gas tends to be a function of the operating depth of the source. Further, the stiffness of the structure and the internal gas are primary determining factors in the source's resonance frequency. Accordingly, the resonance of the source can change based on the operating depth of the source, especially in marine sound sources where the interior volume of the source may be pressure balanced with the external hydrostatic pressure.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to sound sources for marine geophysical surveys. More particularly, in one or more embodiments, added mass or compliance chambers are used in sound sources to compensate for volume changes of the gas internal to the sound source during operation. As discussed in more detail below, the added mass or compliance chamber may shift the resonance frequency of the sound source lower while also increasing the sound output at lower frequencies.

Sound sources may be used in marine geophysical surveying to generate acoustic energy that travels downwardly through water and downwardly into the subsurface rock. Embodiments of the sounds sources may include an outer shell that contains a gas having a gas pressure. By way of example, a sound source may include an outer shell that defines an internal volume in which a gas may be disposed. Examples of suitable sound sources include marine vibrators, bender sources, or acoustic sources. Suitable marine vibrators may be hydraulically powered vibrators, electro-mechanical vibrators, electrical marine seismic vibrators, and vibrators employing electrostrictive (e.g., piezoelectric) or magnetostrictive material. An example of a suitable bender source may include a piezoelectric or other suitable electrostrictive material that when activated involve flexural bending of the source relative to the planar surface of the source when not activated. In some embodiments, the sound source may be a flextensional shell-type source. Flextensional devices including actuators and transducers act as mechanical transformers, which transform and amplify the displacement and force generated in the active element to meet the demands of different applications. Flextensional shell-type sources are generally marine vibrators having an outer shell that vibrates and flexes to generate acoustic energy. Examples of flextensional shell-type sources can be found in U.S. Pat. No. 8,446,798, which is herein incorporated by reference.

In some embodiments, the sound source may have a pressure compensation system. The pressure compensation system may be used, for example, to equalize the internal gas pressure of the sound source's outer shell with the external pressure. The internal gas pressure of the sound source's outer shell will be referred to herein as the "shell internal gas pressure." Pressure compensation may be used, for example, with marine sound sources, where the source needs to undergo a change in volume to achieve a given level of output. As the depth of the sound source increases, the shell internal gas pressure can be increased to equalize pressure with the increasing water pressure due to depth. Air or another suitable gas may be introduced into the outer shell of the source, for example, to increase the shell internal gas pressure. Additional examples of suitable gases may include inert gases which may have a low bulk modulus (e.g., lower bulk modulus than air).

However, increasing the shell internal gas pressure may undesirably impact the resonance frequency of the sound source. In particular, the resonance frequency may increase as the shell internal gas pressure increases. The pressurized gas inside a sound source can have a stiffness higher than that of the outer shell of the sound source in some embodiments. Those of ordinary skill in the art, with the benefit of this disclosure, should appreciate an increase in the shell internal gas pressure may also result in an increase of the bulk modulus (stiffness) of the gas (e.g., air) in the outer shell. As the resonance frequency of the sound source is based on the combination of the stiffness of the outer shell and the stiffness of the gas in the outer shell, this bulk modulus increase impacts the resonance frequency. Thus, the resonance frequency of the sound source may change based on its operating depth, for example, due to changes in the shell internal gas pressure based on depth.

To compensate for changes in the shell internal gas pressure, a compliance chamber may be employed. In accordance with present embodiments, the compliance chamber may contain a gas (e.g., air or another suitable gas) with an internal gas pressure that is lower than the shell internal gas pressure. Additional examples of suitable gases used in the compliance chamber may include inert gases which may have a low bulk modulus (e.g., lower bulk modulus than air). The internal gas pressure of the compliance chamber will be referred to herein as the "chamber internal gas pressure." In example embodiments, the chamber internal gas pressure may be less than 1 atmosphere. In some embodiments, a vacuum or essentially a vacuum can be established in the compliance chamber.

In some embodiments, the compliance chamber may comprise a sealed volume with a chamber internal gas pressure of less than 1 atmosphere when at the water surface (less than about 1 meter depth). Alternatively, the chamber internal gas pressure may be atmospheric pressure when at the water surface. In present embodiments, when the sound source is at operational depth, the chamber internal gas pressure may be less than the shell internal gas pressure. In some embodiments, the sound source may be operated, for example, at a depth of from about 1 meter to about 375 meters and, more particularly, from about 1 meter to about 100 meters. Embodiments of the compliance chambers may comprise a spring-piston assembly in a tube with the chamber internal gas pressure less than the shell internal gas pressure. Alternative embodiments of the compliance chamber may comprise a spring-piston assembly in a flexible bellows, which may be a flexible mechanical structure with a chamber internal gas pressure less than that of the shell internal gas pressure, so that the combination of structure and internal gas is more compliant than the shell internal gas. The compliance chamber may be in indirect fluid communication with the shell internal gas pressure. The term "indirect fluid communication," as used herein generally refers to at least a portion of the compliance chamber being exposed to the shell internal gas pressure without intermingling or intermixing of the chamber internal gas with the shell internal gas. A wide variety of different techniques may be used to place the compliance chamber in indirect fluid communication with the shell internal gas pressure. By way of example, the compliance chamber may be disposed in the outer shell of the sound source. In alternative embodiments, the compliance chamber may be in indirect fluid communication with the gas pressure contained in the outer shell by way of a tube, port, or other suitable mechanism. In present embodiments, the chamber internal gas may not be in direct fluid communication with the shell internal gas.

External energy sources are generally not required for compliance chamber operation, in accordance with example embodiments. Instead, embodiments of the compliance chamber may operate due to a change in pressure differential (e.g., across a sealed piston contained in the compliance chamber) between the shell internal gas pressure and the chamber internal gas pressure. In some embodiments, the resulting force due to the pressure differential may be counteracted by a force applied to a back side of the piston (e.g., a force applied by a spring, such as a compression spring). The force balance can occur for both static (e.g., pressure caused due to increasing source depth) and dynamic (acoustic operation of the sound source) applications. Increasing the shell internal gas pressure typically results in an increased force requirement by the compliance chamber. In embodiments that employ a compression spring, for example, increased force may be achieved through a displacement, therefore a volume change can occur within the compliance chamber due to pressure changes within the sound source. Advantageously, the volume change may compensate the internal volume change of the sound source, when it is radiating sound, resulting in a reduction of stiffness effects of the shell internal gas on source resonance frequency, for example. Another benefit provided by some embodiments may be a reduction of the gas stiffness contained within the internal volume of the sound source. The compliance chamber may be appropriately sized to compensate the entire internal volume change of the sound source resulting in the same resonance frequency independent of water depth. Reducing the system stiffness may be accomplished as the compliance chamber combines with the internal gas of the sound source in a series configuration. Combining both these benefits of the compliance chamber (e.g., volume compensation and stiffness reduction) typically may result in boosting the low-frequency performance of a sound source. Another advantage of the compliance chamber may be that it has its own resonance which could increase the acoustic output from the sound source and possibly increase the bandwidth.

In some embodiments, the sound source may produce display at least one resonance frequency (when submerged in water) between about 1 Hz to about 200 Hz. In alternative embodiments, the sound source may display at least one resonance frequency (when submerged in water) between about 0.1 Hz and about 100 Hz, alternatively, between about 0.1 Hz and about 10 Hz, and alternatively, between about 0.1 Hz and about 5 Hz. A sound source is typically referred to as a VLFS where it has at least one resonance frequency of about 10 Hz or lower.

Figure 1:
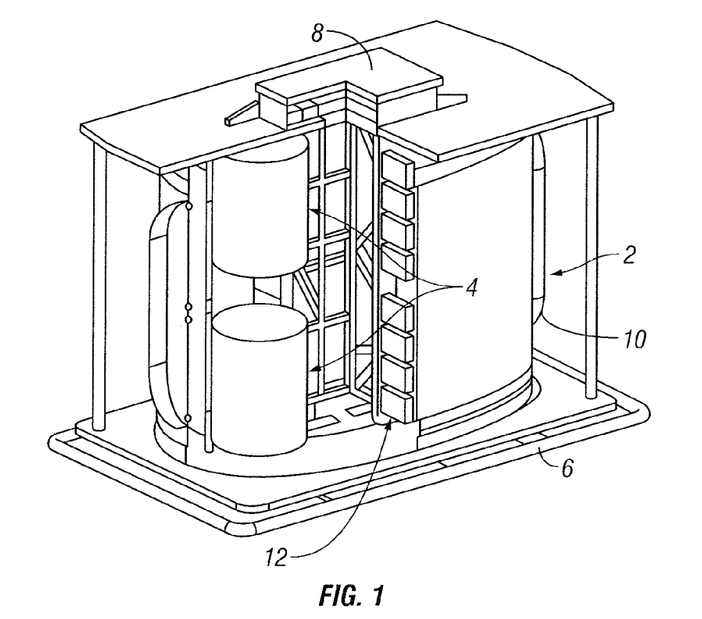
FIG. 1 illustrates an example embodiment of a sound source in partial cross-section, the sound containing multiple compliance chambers.

FIG. 1 illustrates an example embodiment of a sound source 2 that employs one or more compliance chambers 4, for example, to compensate for pressure changes of the shell internal gas pressure. The sound source 2 of FIG. 1 is shown in partial cross-section. In the illustrated embodiment, the sound source 2 is a flextensional shell-type source. As illustrated, the sound source 2 is mounted within a frame 6. A bracket 8 may be mounted to the top of the frame 6. The bracket 8 may be used for deploying the sound source 2 in a body of water. The sound source 2 may comprise an outer shell 10. As illustrated, the compliance chamber 4 may be disposed within the outer shell 10. While FIG. 1 illustrates two compliance chambers 4 disposed in the outer shell 10, it should be understood that the invention is applicable to the use of any number of compliance chambers 4 in a sound source 2. By way of example, embodiments may include the use of one, two, three, four, or more compliance chambers 4 for the sound source 2.

In the illustrated embodiment, the outer shell 10 may be elliptical in shape or other suitable shape, including convex, concave, flat, or combinations thereof. While not illustrated, the outer shell 10 may be formed, for example, by two shell side portions that may be mirror images of one another. The sound source 2 may be a hydraulically powered vibrator, an electro-mechanical vibrator, or an electrical marine seismic vibrator, or alternatively the sound source 2 may employ an electrostrictive (e.g., piezoelectric) or magnetostrictive material. In particular embodiments, the sound source 2 may further comprise a linear drive 12, which may be an electro-dynamic actuator. In some embodiments, the linear drive 12 may be a "moving coil" or "voice coil" actuator. A linear drive 12 that employs a single, bi-directional linear actuator, one or more uni-directional actuators, a plurality of actuators arranged in parallel, or other suitable arrangement are contemplated within the scope of the present invention. The linear drive 12 may be operated to cause vibration and flexing of the outer shell 10 to generate acoustic energy.

Figure 2:
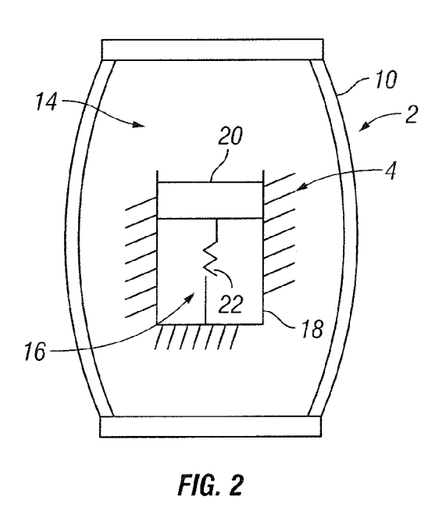
FIG. 2 illustrates another example embodiment of a sound source containing a compliance chamber.

FIG. 2 illustrates another example embodiment of a sound source 2 that employs a compliance chamber 4. As illustrated, the sound source 2 may comprise an outer shell 10 in which the compliance chamber 4 may be disposed. In the illustrated embodiment, the outer shell 10 has a shell internal volume 14, which may contain a gas, such as air, to provide a shell internal gas pressure. The compliance chamber 4 may be in indirect fluid communication with the shell internal volume 14. The compliance chamber 4 may also have a chamber internal volume 16, which may provide a chamber internal gas volume. In some embodiments, the chamber internal volume 16 may contain a gas, such as air. As previously described, the chamber internal gas pressure should be less than the shell internal gas pressure. The chamber internal gas pressure may be less than 1 atmosphere. In accordance with present embodiments, the chamber internal volume 16 may be sealed.

As illustrated, the compliance chamber 4 may comprise a tube 18, a piston 20, and a spring element 22. The chamber internal volume 16 may be defined by the tube 18 and the piston 20. The piston 20 may be slidable in the tube 18 such that, when driven into or out of the tube 10, the chamber internal volume 16 is changed. The piston 20 may be designed with sufficient displacement in the tube 10 to compensate for the change in pressure due to depth plus the change in volume due to operation of the sound source 2. The piston 20 may be sealed in the tube 20, for example, with an o-ring or a bellows. While the piston 20 is shown as a disk or other cylindrical element, it should be understood that other configurations for the piston 20 may be used to effect the desired volume change in the tube 18. For example, the piston 20 may have a different configuration, including square, rectangular, or oblong, among others. A spring piston may be formed by the piston 20 and the spring element 22. The piston 20 may be loaded in the tube 20 with the spring element 22. As illustrated, the spring element 22 may be disposed in the chamber internal volume 16 to exert a biasing action on the piston 20. The spring element 22 may be any spring suitable for exerting a biasing action on the piston 20, including both linear and non-linear springs. By way of example, the spring element 22 may be a compression spring, a torsion spring, or other suitable spring for exerting the desired biasing action. Specific examples of springs that may be used for the spring element 22 include coil springs, leaf springs, and Belleville spring washers, among others. Non-linear springs (such as Belleville spring washers) may be advantageous in certain embodiments by providing a softening response as the pressure increases. Other flexible machined structures could also be used as the spring element 22. By way of example, the piston 20 and the spring element 22 could be replaced by a machined structure with an internal volume. Some portion of the machined structure could act as the spring element 22 and some portion of the machined element could act as the piston 20. For example, a thin, flexible plate (e.g., flexible plate 34 on FIGS. 8A and 8B) with a sealed volume behind it (the gas in the sealed volume being less than the shell internal gas pressure) where the plate flexes when there is a pressure differential across it making the flexible plate perform functions of both the spring element 22 and the piston 20.

Operation of the compliance chamber 4 shown on FIG. 2 will now be described in accordance with an example embodiment. The compliance chamber may operate due to a change in pressure differential across the piston 20 between the shell internal volume 14 and the chamber internal volume 16. By way of example, the change may be due to an increase in pressure due to increased depth or acoustic operation of the sound source 2. In the illustrated embodiment, the resulting force due to the pressure differential may be counteracted by a force applied to the piston 20 by the spring element 22. Increasing the shell internal gas pressure within the shell internal volume 14 typically results in an increased force requirement by the compliance chamber 4. In embodiments where a compression spring is used for the spring element 22 increased force may be achieved through a displacement, therefore a volume change may occur within the chamber internal volume 16 due to pressure changes within the sound source 4. The volume change within the compliance chamber 4 may compensate for changes in the shell internal volume 14. As a result, stiffness effects on the source resonance frequency may be reduced, for example.

Figure 3:
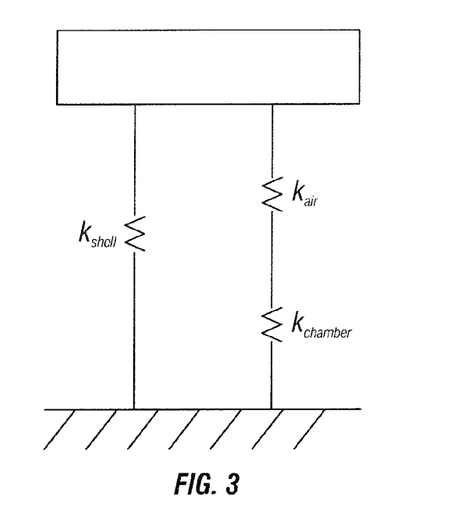
FIG. 3 is a schematic diagram illustrating stiffness of the outer shell, internal gas, and compliance chamber for a sound source in accordance with example embodiments.

FIG. 3 is an example mechanical representation of the stiffness of the outer shell 10, air spring, and the compliance chamber 4. The air in the shell internal volume 14 generally may function as an air spring in its resistance to compression. In the example embodiment, the air spring has a stiffness ($k_{air}$) that should function in series with the stiffness of the compliance chamber 4 ($k_{chamber}$). The air spring in some embodiments has a stiffness ($k_{air}$) that is greater than the stiffness of the compliance chamber 4 ($k_{chamber}$). In example embodiments, multiple compliance chambers 4 may act in series ($k_{chamber\ total} = k_{chamber}/N$, wherein N is the number of compliance chambers 4). The outer shell 10 generally has as stiffness ($k_{shell}$) that functions in parallel with the stiffness of the air spring ($k_{air}$) and the stiffness of the compliance chamber 4 ($k_{chamber}$). A stiff spring element 22 may be needed in the compliance chamber 4 to counteract the pressure change due to depth, wherein F=pressure*piston area=$k_{chamber}$*x), where x is the piston displacement. However, a soft spring element 22 may be needed to counter the air spring such that the ($k_{chamber}$) is less than the stiffness of the air spring ($k_{air}$).

Figure 4:
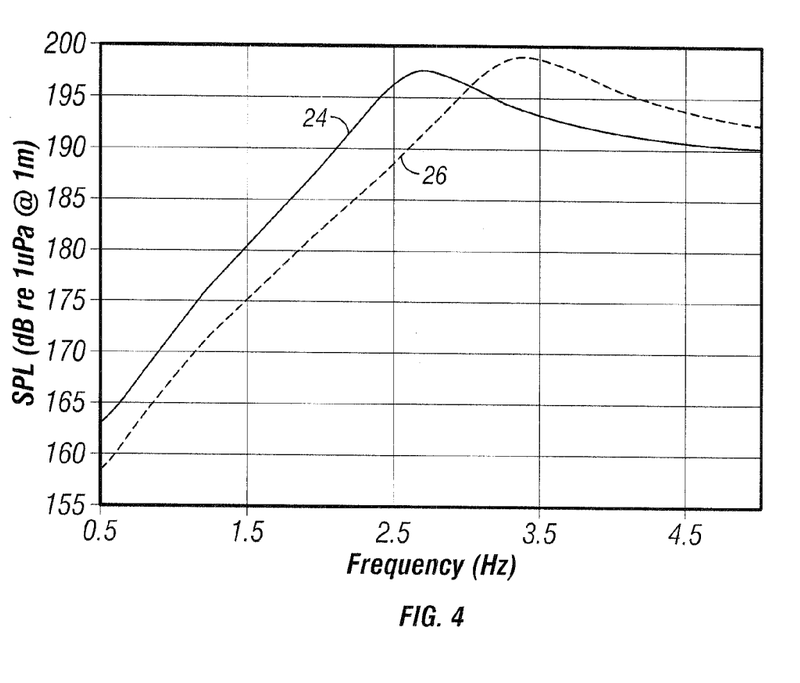
FIG. 4 is a simulated amplitude spectrum showing effect of using a compliance chamber in accordance with example embodiments.

FIG. 4 shows the results from a finite element simulation to evaluate use of compliance chambers 4 in a sound source 2 in accordance with example embodiments. The output of the sound source 2 with the addition of four compliance chambers 4 is shown at 24 on FIG. 4. The output of the same sound source 2 without a compliance chamber 4 is shown at 26 on FIG. 4. The curves represent the source output when towed at a depth of about 50 meters. Each compliance chamber 4 had a spring constant (dynamic portion only) of 1.0E+5 Newtons per meter. The air spring in the shell internal volume 14 had a spring constant of 2.86E+6, calculated from bulk modulus. The piston 20 had an area of 0.32 square meters. As illustrated by FIG. 4, employment of the compliance chamber 4 decreased the resonance frequency from 3.4 Hz to 2.7 Hz. In addition, the output at all frequencies below the resonance frequency was increased by about 4 decibels to about 5 decibels.

Figure 5:
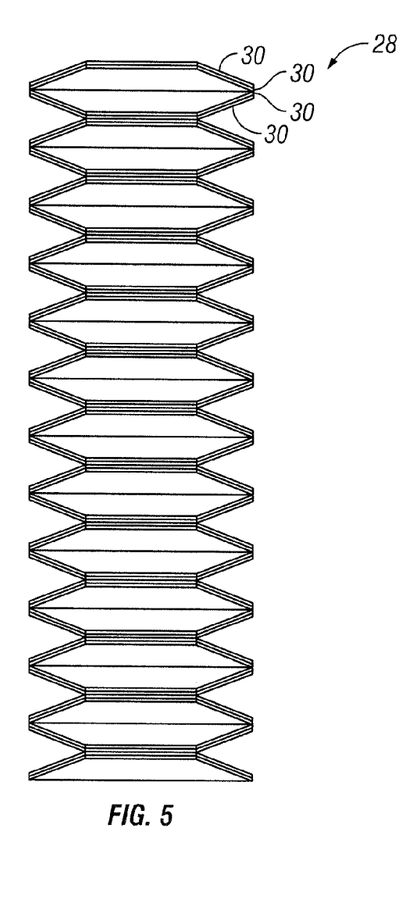
FIG. 5 illustrates a spring stack that may be employed in a compliance chamber in example embodiments.

FIG. 5 illustrates an example embodiment of a spring stack 28 that may be used in accordance with example embodiments. In the illustrated embodiment, the spring stack 28 comprises a stack of Belleville spring washers 30. Examples of suitable Belleville spring washers may include the AM Series Belleville springs available from Rolex Springs, Baltimore, Md., such as the Rolex Spring AM-25012770. A spring element 22 (e.g., shown on FIG. 2) may include one or more spring stacks 28. Those of ordinary skill in the art will appreciate that multiple Belleville spring washers 30 may be stacked to modify the spring constant. Stacking in the same direction will add the spring constant in parallel to create a stiffer spring. Stacking in an alternating direction is similar to adding springs in series and may create a lower spring constant with more deflection. Stacking multiple Belleville spring washers 30 in alternating directions and different configurations can allow design of a spring element 22 with a specific spring constant.

In the illustrated embodiment, the spring stack 28 comprises fifty Belleville spring washers 30 arranged in a series stack. As illustrated, adjacent pairs of the spring washers 30 are arranged in parallel so that the spring stack 28 comprises twenty-five pairs of spring washers 30 arranged series. However, it should be understood that the number and configuration of the spring washers 30 may be varied to provide a selected spring constant for the spring stack 28. In one particular embodiment, each spring washer 30 has an outer diameter of 245 millimeters and a mass of 2 kilograms. More than one spring stack 28 may be used in accordance with example embodiments.

Figure 6:
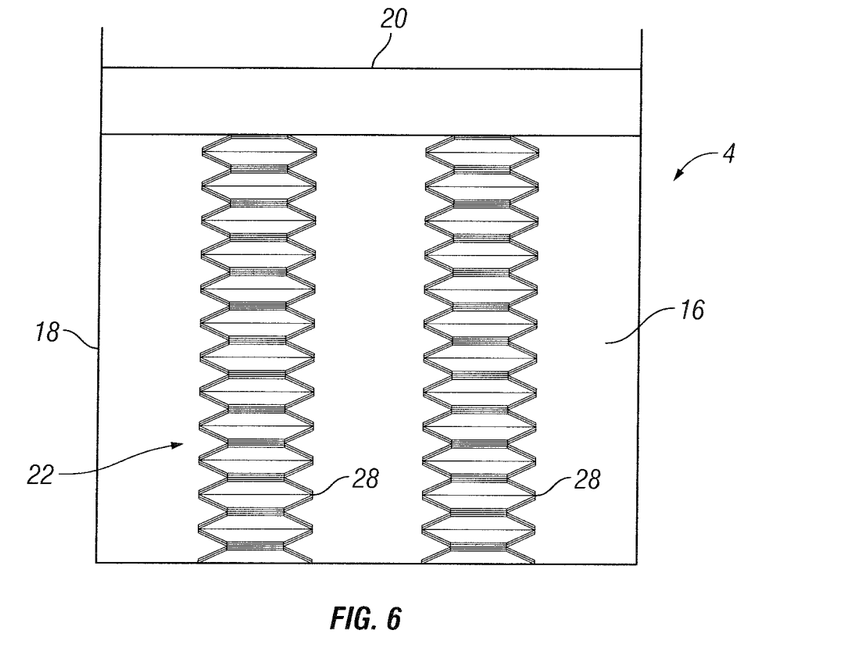
FIG. 6 illustrates employment of multiple spring stacks in a compliance chamber in example embodiments.

FIG. 6 illustrates an example compliance chamber 4 that employs multiple spring stacks 28. As illustrated, the spring element 22 may comprise two spring stacks 28. The spring stacks 28 may be disposed in the chamber internal volume 16. As previously described, embodiments may include the spring element 22 exerting a biasing action on the piston 20, which is slidable in the tube 18.

Figure 7:
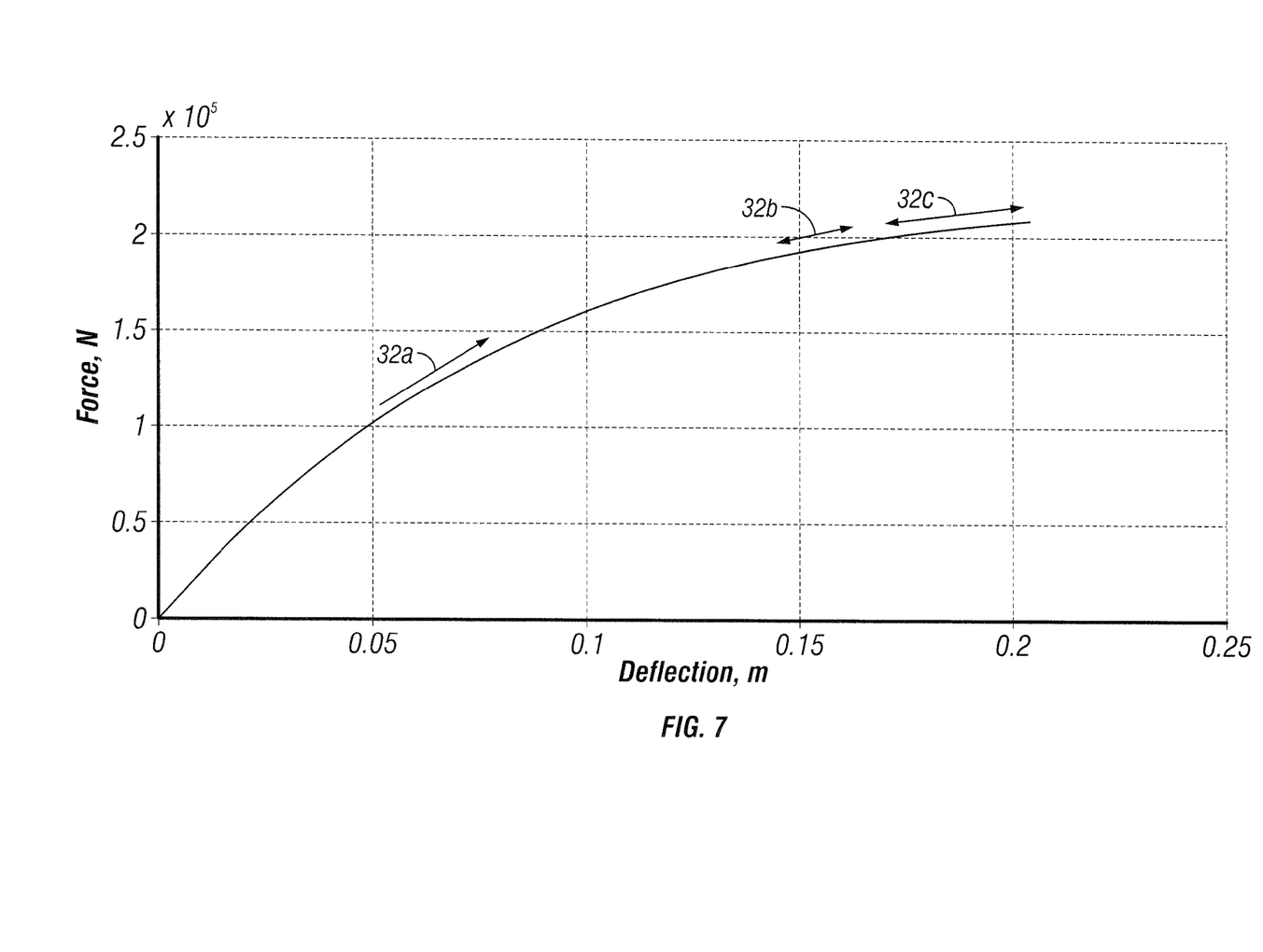
FIG. 7 is a diagram of a simulated force-deflection chart for a stack of Belleville spring washers in accordance with example embodiments.

FIG. 7 is a diagram of a force-deflection curve for the spring stack 28 shown on FIG. 5. The force-deflection curve models response of two spring stacks 28 to forces encountered when employed in a compliance chamber 4 in example embodiments. The initial compression of the spring stacks 28 during descent of the sound source 2 from a depth of 0 meters to about 50 meters along arrow 32a. The compression of the spring stacks 28 during operation of the sound source 2 at a depth of about 50 meters is shown along arrow 32b. The spring stacks 28 have a safety margin as shown along arrow 32c. As illustrated by FIG. 7, the spring stacks 28 may be advantageous in some embodiments due to their softening response as the force increases. Among other advantages, this may reduce the stiffness of the compliance chamber 4 resulting in improved acoustic performance for the sound source 2.

Figure 8A:
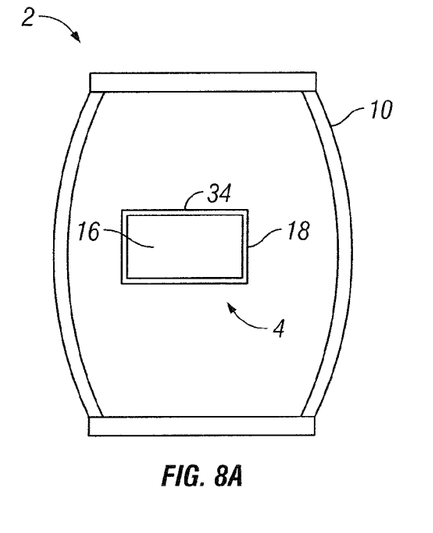
FIGS. 8A and 8B illustrate another example embodiment of a sound source containing a compliance chamber.
Figure 8B:
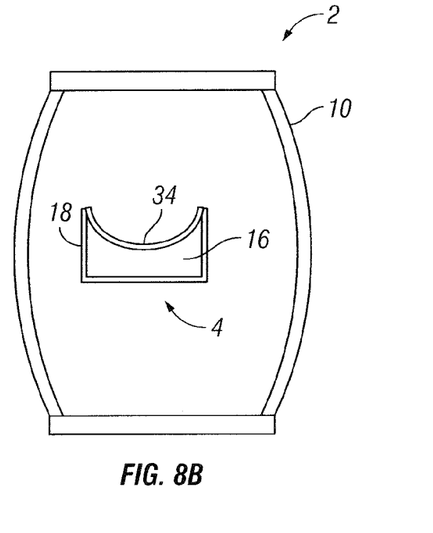

FIGS. 8A and 8B illustrate another example embodiment of a sound source 2 that employs a compliance chamber 4. As illustrated, the sound source 2 may comprise an outer shell 10 in which the compliance chamber 4 may be disposed. In the illustrated embodiment, the compliance chamber 4 has a chamber internal volume 16 which may provide a chamber internal gas volume having a chamber internal gas pressure less than the shell internal gas pressure. As illustrated the compliance chamber 4 may comprise a flexible plate 34 having the chamber internal volume 16 behind it. The flexible plate 34 may be disposed across the opening of a tube 18 or other suitable container, for example. In response to changes in the shell internal gas pressure, the flexible plate 34 may flex, as best seen in FIG. 8B, such that the air spring formed by the chamber internal gas pressure applies a biasing force to the flexible plate 34. Accordingly, application of a pressure differential across the flexible plate 34 should result in a volume change for the compliance chamber 4.

Figure 9:
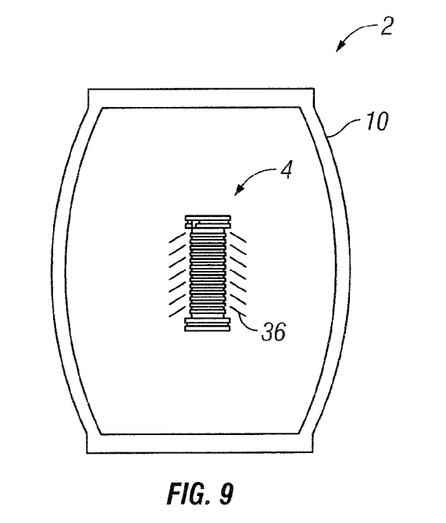
FIG. 9 illustrates another example embodiment of a sound source containing a compliance chamber.

FIG. 9 illustrates another example embodiment of a sound source 2 that employs a compliance chamber 4. As illustrated, the sound source 2 may comprise an outer shell 10 in which the compliance chamber 4 may be disposed. In the illustrated embodiment, the compliance chamber 4 comprises a flexible mechanical structure, such as flexible bellows 36, having a gas pressure less than the shell internal gas pressure. The combination of the flexible bellows 36 and the chamber internal gas may be more compliant than the shell internal gas so that application of a pressure differential across the flexible bellows 36 may result in a volume change for the compliance chamber 4.

Accordingly, one or more compliance chambers 4 may be used to adjust the resonance frequency of the sound source 2, thus compensating for pressure changes of the shell internal gas pressure. Advantageously, one or more compliance chambers may be used to shift the resonance frequency to a lower range and increase the sound output, for example, at lower frequencies. The use of multiple compliance chambers 4 and/or a softer spring element 22 may improve performance even further. Possible drawbacks include that the spring element 22 may undesirably increase the mass of the sound source 2 in some embodiments. By way of example, the number and size of Belleville spring washers 30 may be required can be large, which may significantly increase the mass of the sound source 2. The dynamics in the spring stack 28 of spring washers 30 may also impact performance and there may be friction concerns with the spring stack 28 in some embodiments.

In accordance with further embodiments, an alternative technique to compensate for pressure changes of the shell internal gas pressure may include changing the mass of the sound source 2'. By way of example, mass may be added to the outer shell 10 (e.g., shown on FIGS. 1 and 2) to shift the resonance frequency. In some embodiments, this approach of added mass may be combined with the previously described compliance chamber 4, as described with respect to FIGS. 1-9, for example.

Figure 10:
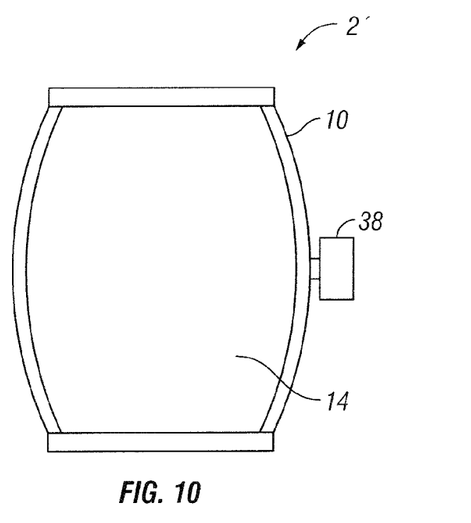
FIG. 10 illustrates an example embodiment of a sound source having added mass on the outer shell.

FIG. 10 illustrates a sound source 2' that includes an added mass 38. As illustrated, the sound source 2 may include an outer shell 10 having an interior volume 14. The outer shell 10 may be similar in construction to the outer shell 10 described above with respect to FIG. 1. In the illustrated embodiment, the mass 38 is coupled to an outside surface of the outer shell 10, for example, in the water volume. In alternative embodiments (not shown), the mass 38 may be coupled to the interior of the outer shell 10, for example, in the interior volume 14. The mass 38 that is added may include a variety of suitable objects for adding mass 38 to the outer shell 10, including simple metal structures, portions of the electromechanical driver may also be attached to the outer shell 10, or any object containing mass that could be attached to the outer shell 10. By way of example, all or a portion of the driver (e.g. the magnetic parts) may be attached to the outer shell 10 for adding the mass 38. In some embodiments, the mass 38 may be concentrated at the midsection of the outer shell 10. By way of example, the mass 38 is shown in FIG. 10 attached to the midsection of the outer shell 10. In this manner, the mass 38 may have a relatively small impact on the shell stiffness. Embodiments may include increasing density to change the mass 38. The mass 38 may be attached to the outer shell 10 using any of a variety suitable techniques, including mechanical attachment (e.g., fasteners) and adhesives, among others. While not illustrated on FIG. 10, the sound source 2' may further comprise an actuator (e.g., linear drive 12 on FIG. 2) disposed at least partially in the outer shell 10 and coupled to the outer shell 10. The actuator may be operated to cause vibration and flexing of the outer shell 10 to generate acoustic energy.

Figure 11:
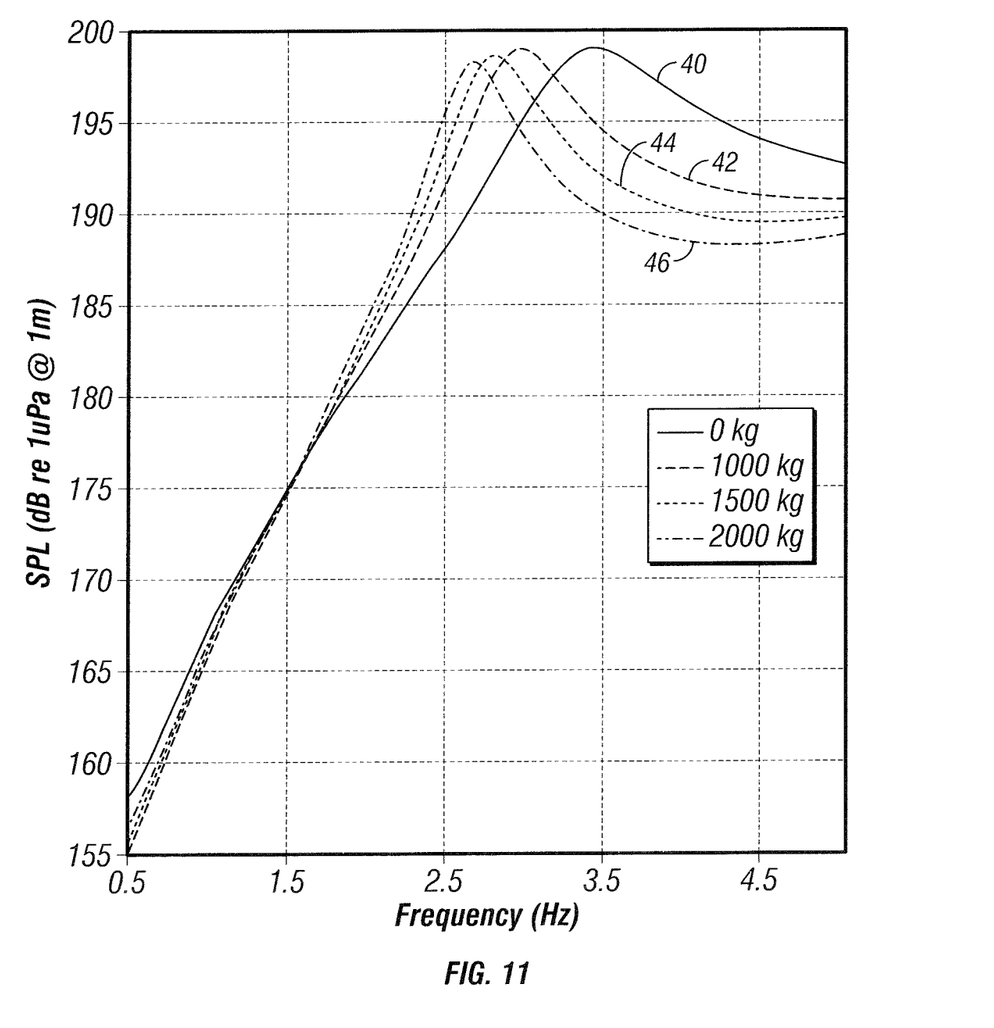
FIG. 11 is a simulated amplitude spectrum showing effect of adding masses to the outer shell of a sound source in accordance with example embodiments.

FIG. 11 shows the results from a finite element simulation for attachment of varying masses to a sound source 2' in accordance with example embodiments. The curves in FIG. 11 represent the output of the sound source 2' towed at 50 meters. The curves in FIG. 11 represent the output of the sound source 2' with the attachment of 0 kilograms ("kg"), 1000 kg, 1500 kg, and 2,000, respectively, shown at 40, 42, 44, and 46 in FIG. 11. As illustrated, the resonance of the sound source 2' was shifted from 3.4 Hz to 2.7 Hz with the addition of 2000 kg. Below 2 Hz, there was very little difference in the sound output.

Accordingly, addition of a mass 38 may be used in accordance with example embodiments to adjust the resonance frequency of a sound source 2' down to a desired range. Advantageously, addition of the mass 38 may be a relatively simple technique for shifting the resonance frequency. In some embodiments, the more mass of the driver (e.g., linear drive 12 on FIG. 1) may be added to the outer shell, thus adding little additional mass to the sound source 2' and little complexity to the design. However, drawbacks to this technique include the low impact on sound output of frequencies below resonance frequency, as well as a possible decrease in sound output above the resonance frequency.

Figure 12:
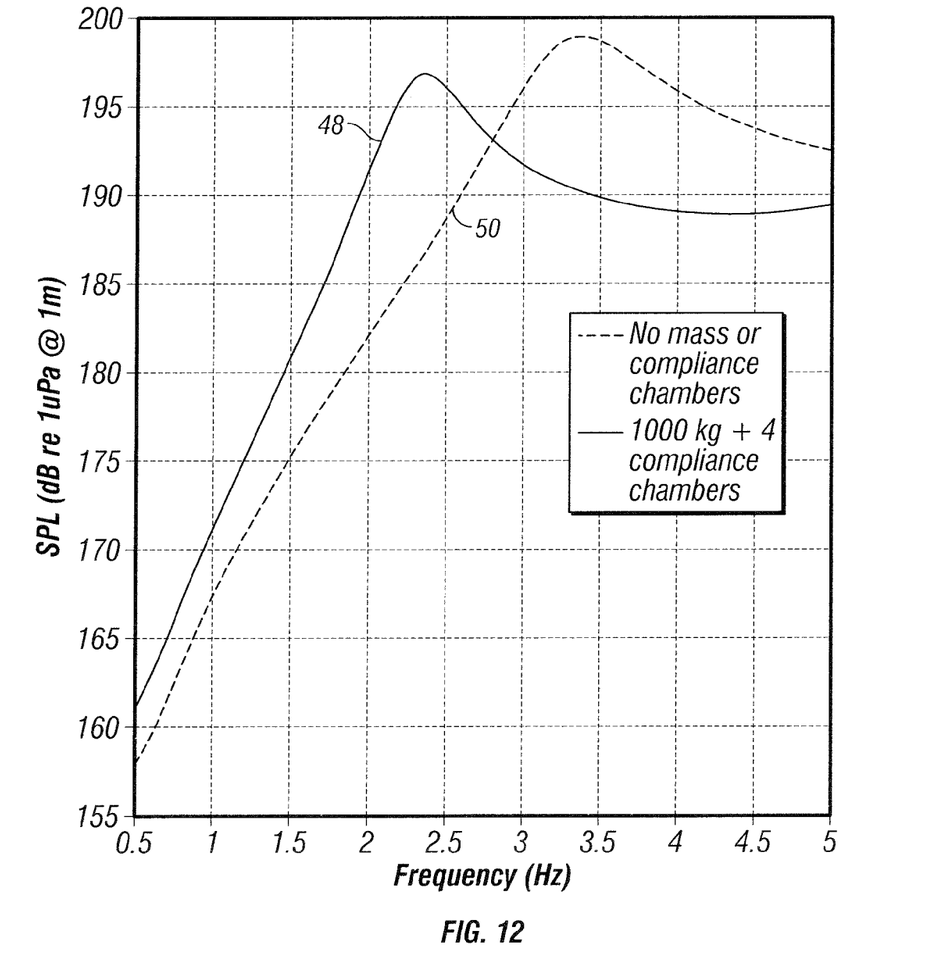
FIG. 12 is a simulated amplitude spectrum showing effect of using a compliance chamber in combination with added mass on the source outer shell in accordance with example embodiments.

FIG. 12 shows the results from a finite element simulation to determine the effect of combining multiple compliance chambers 4 with an added mass 38. The output of a sound source with the addition of four compliance chambers 4 and a mass 38 of 1000 kg is shown at 48 on FIG. 12. The output of the same sound source without a compliance chamber 4 or added mass 38 is shown at 50 on FIG. 12. The curves represent the source output at 50 meters. The mass 38 was added to the exterior of the outer shell 10 at its midsection. Each compliance chamber 4 had a spring constant (dynamic portion only) of 1.0E+5 Newtons per meter. The air spring in the shell internal volume 14 had a spring constant of 2.86E+6, calculated from bulk modulus. The piston 20 had an area of 0.32 square meters. As illustrated by FIG. 12, employment of the compliance chambers 4 in combination with the added mass 38 decreased the resonance from 3.4 Hz to 2.4 Hz. In addition, the output at all frequencies below resonance frequency was increased by about 4 decibels to about 5 decibels. While not shown, the added mass 38 may be used to compensate for increased depths in accordance with example embodiments.

Figure 13:
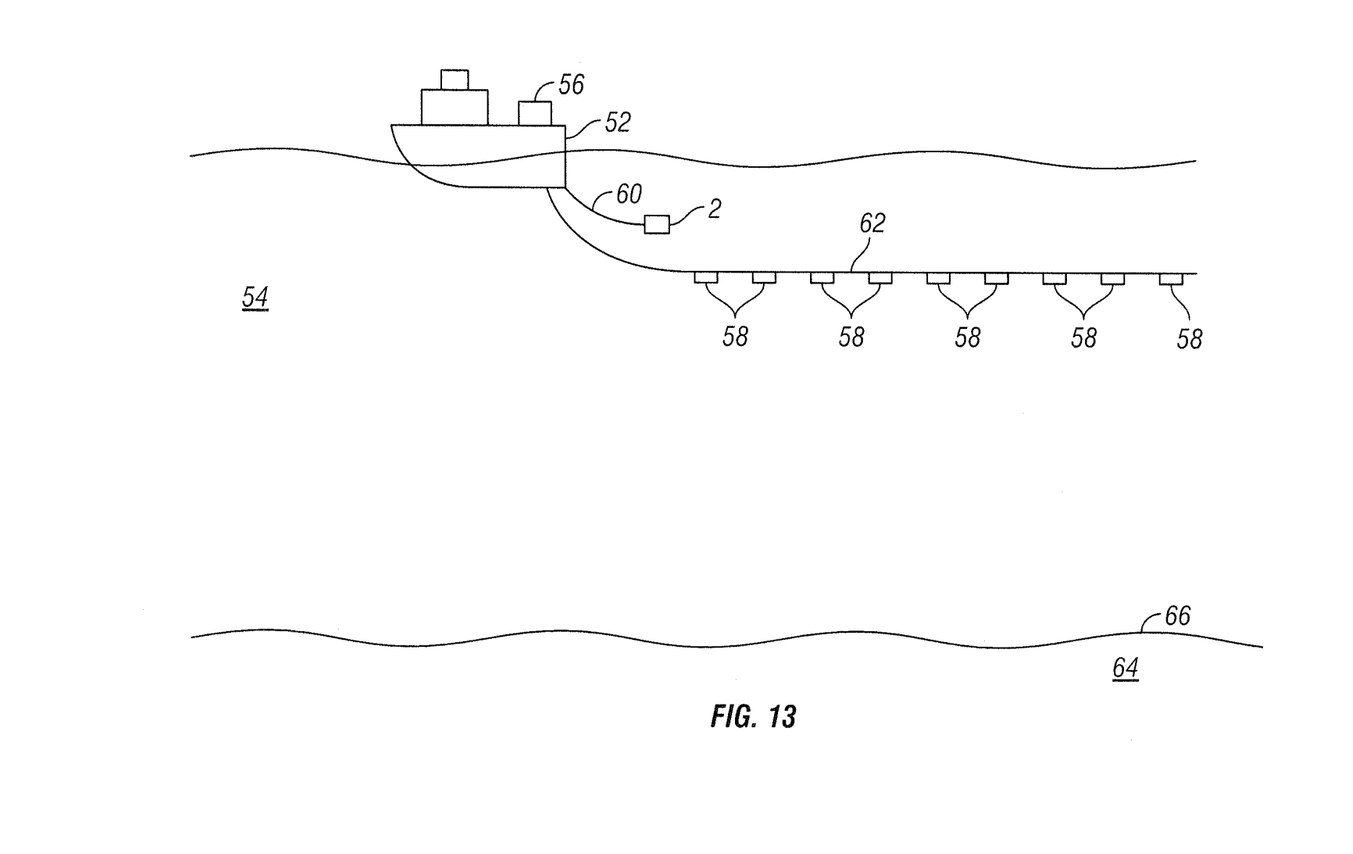
FIG. 13 is an example embodiment of a marine seismic survey system using a sound source.

FIG. 13 illustrates an example technique for acquiring marine seismic data that can be used with embodiments of the present techniques. In the illustrated embodiment, a survey vessel 52 moves along the surface of a body of water 54, such as a lake or ocean. The survey vessel 52 may include thereon equipment, shown generally at 56 and collectively referred to herein as a "recording system." The recording system 56 may include devices (none shown separately) for detecting and making a time indexed record of signals generated by each of seismic sensors 58 (explained further below) and for actuating a sound source 2 at selected times. The recording system 56 may also include devices (none shown separately) for determining the geodetic position of the survey vessel 52 and the various seismic sensors 58.

As illustrated, the survey vessel 52 (or a different vessel) may tow the sound source 2 in the body of water 54. A source cable 60 may couple the sound source 2 (or sound source 2') to the survey vessel 52. The sound source 2 (or sound source 2') may be towed in the body of water 54 at a depth ranging from 0 meters to about 120 meters, for example. While only a single sound source 2 is shown in FIG. 13, it is contemplated that embodiments may include more than one sound source 2 (or sound source 2') towed by the survey vessel 52 or a different vessel. In some embodiments, one or more arrays of sound sources 2 may be used. At selected times, the sound source 2 may be triggered, for example, by the recording system 56, to generate acoustic energy. The survey vessel 52 (or a different vessel) may further tow at least one sensor streamer 62 to detect the acoustic energy after it has interacted, for example, with rock formations 64 below the water bottom 66. As illustrated, both the sound source 2 and the sensor streamer 62 may be towed above the water bottom 66. In some embodiments, more than one sensor streamer 310 may be towed by the survey vessel, which may be spaced apart laterally, vertically, or both laterally and vertically. The seismic streamer 62 may contain seismic sensors 58 thereon at spaced apart locations. The seismic sensors 58 may be any type of seismic sensors known in the art, including hydrophones, particle velocity sensors, particle displacement sensors, particle acceleration sensors, or pressure gradient sensors, for example. By way of example, the seismic sensors 58 may generate response signals, such as electrical or optical signals, in response to detected acoustic energy. Signals generated by the seismic sensors 58 may be communicated to the recording system 56. The detected energy may be used to infer certain properties of the subsurface rock, such as structure, mineral composition and fluid content, thereby providing information useful in the recovery of hydrocarbons.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A sound source for marine geophysical surveys, comprising:
an outer flextensional shell containing a first gas at a first gas pressure, wherein the outer flextensional shell is operable to vibrate and flex to generate acoustic energy;
a compliance chamber in indirect fluid communication with the first gas such that the first gas does not intermix with second gas in the compliance chamber, wherein the second gas is at a second gas pressure, wherein the second gas pressure is lower than the first gas pressure, wherein the compliance chamber is operable to adjust a resonance frequency of the sound source to compensate for changes in the first gas pressure through a volume change in the compliance chamber; and
a driver separate from the compliance chamber, wherein the driver is operable to cause vibration and flexing of the outer flextensional shell.

2. The sound source of claim 1, wherein sound source is a flextensional-shell type source.

3. The sound source of claim 1, wherein the sound source has at least one resonance frequency of about 10 Hz or lower.

4. The sound source of claim 1, wherein the compliance chamber is disposed in the outer flextensional shell.

5. The sound source of claim 1, further comprising one or more additional compliance chambers in indirect fluid communication with the first gas.

6. The sound source of claim 1, wherein the compliance chamber comprises a tube, a piston slidable in the tube, and a spring element that exerts a biasing force against the piston.

7. The sound source of claim 6, wherein the tube and piston define a sealed volume that contains the second gas, wherein the spring element is disposed in the sealed volume.

8. The sound source of claim 6, wherein the spring element comprises a nonlinear spring.

9. The sound source of claim 6, wherein the spring element comprises a stack of Belleville spring washers.

10. The sound source of claim 9, wherein the stack of Belleville spring washers is arranged in a series stack, and wherein adjacent pairs of the Belleville spring washers in the series stack are arranged in parallel.

11. The sound source of claim 1, wherein the compliance chamber comprises a flexible plate that together with a container defines a sealed internal volume that contains the second gas.

12. The sound source of claim 1, wherein the compliance chamber comprises a flexible bellows that defines a sealed internal volume that contains the second gas.

13. The sound source of claim 1, wherein the outer flextensional shell further comprises an added mass.

14. The sound source of claim 1, wherein the sound source comprises a pressure compensation system operable to introduce a gas into the outer shell to increase the first gas pressure, wherein the compliance chamber is operable due a change in differential pressure between the first gas pressure and the second gas pressure to effect a change in volume of the compliance chamber.

15. The sound source of claim 1, wherein the compliance chamber is operable due to a change in differential pressure between the first gas pressure and the second gas pressure to effect a volume change of the compliance chamber, wherein the compliance chamber includes a spring element to provide a biasing action to counteract increases in the first gas pressure.

16. The sound source of claim 1, wherein the second gas pressure is less than 1 atmosphere.

17. A sound source for marine geophysical surveys, comprising:
an outer shell containing a first gas at a first gas pressure;
a mass coupled to the outer shell;
a compliance chamber containing a second gas at a second gas pressure, wherein the second gas pressure is lower than the first gas pressure, wherein the compliance chamber is in indirect fluid communication with the first gas such that the second gas does not intermix with the first gas, wherein the compliance chamber comprises a tube, a piston slidable in the tube, and a spring element that exerts a biasing force against the piston; wherein the compliance chamber is configured to operate due to a change in a pressure differential across the piston; and
a driver separate from the compliance chamber and coupled to the outer shell, wherein the driver is operable to cause vibration and flexing of the outer shell.

18. The sound source of claim 17 wherein sound source is a flextensional-shell type source.

19. The sound source of claim 17 wherein the mass is added to an outside surface of the sound source.

20. The sound source of claim 17, wherein the second gas pressure is less than 1 atmosphere.

21. A method, comprising:
disposing a sound source in a body of water, the sound source comprising:
an outer shell containing a first gas at a first gas pressure;
a compliance chamber in indirect fluid communication with the first gas such that a second gas in the compliance chamber does not intermix with the first gas, wherein the second gas is at a second gas pressure, wherein the second gas pressure is lower than the first gas pressure; and
a driver separate from the compliance chamber, wherein the driver is operable to cause vibration and flexing of the outer shell; and
operating the sound source to generate acoustic energy; and
changing an internal volume of the compliance chamber in response to a pressure differential between the first gas pressure and the second gas pressure caused by the operating the sound source to adjust a resonance frequency of the sound source and thus compensate for pressure changes in the first gas pressure.

22. The method of claim 21, wherein the compliance chamber comprises a tube, a piston slidable in the tube, and a spring element that exerts a biasing force against the piston, wherein adjusting the second gas pressure comprises displacing the piston in the tube.

23. The method of claim 22, wherein the spring element comprises a stack of Belleville spring washers such that displacing the piston in the tube comprises compressing the stack of the Belleville spring washers.

24. The method of claim 21, further comprising triggering the sound source to generate acoustic energy; and detecting some of the acoustic energy after it has interacted with one or more rock formations below a bottom of the body of water.

25. The method of claim 21, wherein the resonance frequency is less about 10 Hz or less.

26. The method of claim 21, wherein the second gas pressure is less than 1 atmosphere when the sounds source is at a depth of less than about 1 meter.

27. A method, comprising:
disposing a sound source at a depth in a body of water, the sound source comprising:
an outer shell containing a first gas at a first gas pressure;
a compliance chamber in indirect fluid communication with the first gas, the compliance chamber comprising a sealed internal volume, wherein the second gas does not intermix with the first gas, wherein the compliance chamber comprises a tube, a piston slidable in the tube, and a spring element that exerts a biasing force against the piston; and
a driver separate from the compliance chamber, wherein the driver is operable to cause vibration and flexing of the outer shell;
changing the depth of the sound source in the body of water;
changing the first gas pressure in response to changing the depth of the sound source; and
changing the sealed internal volume of the compliance chamber in response to changing the first gas pressure, wherein the changing the sealed internal volume comprises displacing the piston in the tube in response to a change in pressure differential between the first gas pressure and the second gas pressure across the piston.

28. The method of claim 27, wherein changing the sealed internal volume comprises displacing the piston in the tube.

29. The method of claim 27, wherein the spring element comprises a stack of Belleville spring washers such that displacing the piston in the tube comprises compressing the stack of the Belleville spring washers.

30. The method of claim 27, wherein the sound source has at least one resonance frequency of about 10 Hz or less.

31. The method of claim 27, wherein the second gas has a second gas pressure that is less than 1 atmosphere when the sounds source is at a depth of less than about 1 meter.

* * * * *